UNITED STATES PATENT OFFICE.

PETER C. VOGELLUS, OF PHILADELPHIA, PENNSYLVANIA.

PROCESS OF EXTRACTING OIL FROM FISH.

SPECIFICATION forming part of Letters Patent No. 432,808, dated July 22, 1890.

Application filed April 26, 1888. Serial No. 271,888. (Specimens.)

*To all whom it may concern:*

Be it known that I, PETER C. VOGELLUS, a subject of the King of Denmark, residing in the city and county of Philadelphia, State of Pennsylvania, have invented a new and useful Improvement in the Process of Extracting Oil from Fish, which improvement is fully set forth in the following specification and accompanying drawing.

My invention consists of an improved process of extracting oil from fish; and the object of the invention is to provide a process which will extract all the oil from the fish.

The invention consists in placing fish or parts of fish in their crude state in a suitable apparatus, wherein it is simultaneously desiccated and disintegrated, and next treating the material with a cold solvent to remove the oil, leaving the fish a marketable product.

In my improved process the fish or parts of fish are disintegrated by agitation, and the oil-containing cells of the fish are broken up, whereby the oil is all extracted from the fish by means of the solvent.

It is not broadly new to extract oil from fish by the employment of a solvent, as such has been already done; but in extracting the oil from fish a special process must be employed, because the water in the fish prevents the solvent from coming in contact with all of the oil contained in the fish, but my process overcomes this objection by having the fish desiccated before treatment.

In carrying my process into effect I take menhaden, dog, or other fish, or the heads, livers, or other parts of fish, and place the same in a suitable apparatus, preferably a combined drier and digester, where they are first desiccated, after which they are subjected to the action of the solvent, one or more washings of which may be employed, according to the amount of oil in the fish, the action of the solvent removing the oil from said fish. The solvent and oil are then discharged from the digester and by any preferred means the oil is separated from the solvent and is then ready for the market, and the solvent may be saved for future use.

A certain amount of the solvent will be found to adhere to the fish by reason of the affinity of adhesion, and this may be removed by distilling or by other means, and the fish which have been treated are removed from the digester, and are also ready for the market, being suitable for fertilizers.

It will thus be seen that by the employment of my improved process the oil is entirely extracted from the fish, and that the fish after being treated is also ready for the market, thus producing two marketable products—viz., the oil and fish.

My process is very easily carried into effect, is thoroughly efficient for the purpose intended, and requires but a small expense to effect it.

I am aware that it is not new to remove the oil from fish by means of a solvent such as naphtha; but as far as I am aware it is customary to heat the mass during the process of comminuting it. This necessarily requires the apparatus to be of a massive and very strong character to resist the action of the heated solvent, and therefore very expensive; but by the process herein described, wherein the desiccated and disintegrated material is operated upon without heating the same, the apparatus may be of a much lighter and therefore less expensive character.

Having thus described my invention, what I claim as new, and desire to secure by Letters Patent, is—

The herein-described process of treating fish by which the oil is extracted therefrom and the fish made a marketable product, consisting in simultaneously desiccating and disintegrating the fish and then subjecting the same to the action of a cold solvent, substantially as described.

PETER C. VOGELLUS.

Witnesses:
WM. N. MOORE,
JAMES F. KELLY.